United States Patent
Partanen

(10) Patent No.: US 7,547,356 B2
(45) Date of Patent: Jun. 16, 2009

(54) SYNTHETIC ASPHALT RECYCLED TIRE RUBBER EMULSIONS AND PROCESSES FOR MAKING THEM

(76) Inventor: John Eric Partanen, 763 Tejon Ave., Colton, CA (US) 92324

( * ) Notice: Subject to any disclaimer, the term of this patent is extended or adjusted under 35 U.S.C. 154(b) by 588 days.

(21) Appl. No.: 11/321,361

(22) Filed: Dec. 28, 2005

(65) Prior Publication Data

US 2006/0130704 A1 Jun. 22, 2006

Related U.S. Application Data

(63) Continuation of application No. 10/799,382, filed on Mar. 12, 2004, now abandoned.

(60) Provisional application No. 60/486,963, filed on Jul. 14, 2003.

(51) Int. Cl.
*C08L 95/00* (2006.01)
(52) U.S. Cl. .................. 106/277; 106/225; 106/281.1; 106/284.01; 524/59; 524/60
(58) Field of Classification Search ............... 106/225, 106/277, 281.1, 284.01; 524/59, 60
See application file for complete search history.

(56) References Cited

U.S. PATENT DOCUMENTS

| | | | |
|---|---|---|---|
| 4,018,730 A * | 4/1977 | McDonald | 106/277 |
| 4,073,659 A * | 2/1978 | Burris | 106/277 |
| 4,137,204 A * | 1/1979 | McDonald | 106/277 |
| 4,437,896 A | 3/1984 | Partanen | |
| 4,621,108 A | 11/1986 | Burris | |
| 4,639,307 A * | 1/1987 | Goodrich | 106/284 |
| 5,334,641 A * | 8/1994 | Rouse | 524/71 |
| 5,342,866 A * | 8/1994 | Trumbore et al. | 524/68 |
| 5,501,730 A * | 3/1996 | Duong et al. | 106/281.1 |
| 5,539,029 A | 7/1996 | Burris | |
| 5,811,477 A | 9/1998 | Burris | |
| 6,245,850 B1 * | 6/2001 | Fields | 524/60 |
| 6,346,561 B1 * | 2/2002 | Osborn | 524/59 |
| 6,653,389 B2 * | 11/2003 | Burris et al. | 524/59 |
| 6,894,092 B2 * | 5/2005 | Sylvester | 524/59 |
| 7,074,846 B2 * | 7/2006 | Sylvester et al. | 524/71 |
| 7,087,665 B2 * | 8/2006 | Sylvester et al. | 524/60 |

* cited by examiner

*Primary Examiner*—Helene Klemanski
(74) *Attorney, Agent, or Firm*—James M. Duncan, Esq.; Klein, DeNatale, Goldner, Cooper , et al.

(57) ABSTRACT

Synthetic asphalt and petroleum asphalt modified synthetic asphalt emulsions which contain recycled tire rubber and processes for making the emulsions at temperatures above ambient or room temperature. These emulsions may contain significant quantities of recycled tire rubber and recycled and reclaimed motor oils and fluxes. In addition, aluminum chloride and ferric chloride may be used in clay-in-water solutions to form emulsifying agents for the synthetic asphalt and modified synthetic asphalt mixtures.

2 Claims, No Drawings

US 7,547,356 B2

SYNTHETIC ASPHALT RECYCLED TIRE RUBBER EMULSIONS AND PROCESSES FOR MAKING THEM

This is a Continuation-In-Part of application Ser. No. 10/799,382 which was filed on Mar. 12, 2004 now abandoned and for which the inventor claimed domestic priority on Provisional Application No. 60/486,963 filed on Jul. 14, 2003.

BACKGROUND OF THE INVENTION

This invention relates to improved synthetic asphalt recycled tire rubber emulsions and to processes for making these improved emulsions. These improved emulsions are mixtures of ingredients comprising gilsonite, man-made asphaltene residiums, tall oil products including crude tall oil, tall oil, and tall oil pitch, which may be modified with petroleum asphalt, petroleum base oils, petroleum base lube oil extracts, reclaimed and recycled motor oil, reclaimed and recycled motor oil fluxes, water, surfactants, clays and clay-like materials, chemicals, mineral fillers, crushed and sieve sized mineral aggregates, polymers, natural and man-made fibers, and granulated minus 10 mesh to minus 80 mesh recycled tire rubber. The inventor herein has had in effect U.S. Pat. No. 4,437,896 issued Mar. 20, 1984, (the '896 patent). In this referenced patent are formulations and processes for making various synthetic asphalt compositions including synthetic asphalt emulsions. The present invention comprises improvements to synthetic asphalt recycled tire rubber emulsions and processes for making them. These improvements include exact formulations and processes not disclosed in, taught in, or apparent from the '896 patent, all of which have been developed after the '896 patent was granted in 1984.

Petroleum asphalt is typically made from refining crude petroleum oil. Petroleum asphalt is comprised of four major hydrocarbon components: (1) asphaltenes, (2) polar resins, (3) aromatic oils, and (4) saturated oils. The asphaltenes and polar resins are generally dispersed in the aromatic and saturated oils. Two primary factors that determine the grade of the asphalt are the proportion of the asphaltenes and polar resins together, to the proportion of the aromatic and oils, and the viscosity of the resulting mixture. The physical characteristics of petroleum asphalt such as needle penetration, flash point, kinematic viscosity, absolute viscosity, specific gravity, rotational viscosity, complex modulus as determined by dynamic shear rheometers, and aging indexes all emerge from the dispersion of asphaltenes and polar resins in the aromatic and saturated oils present within the petroleum asphalt.

Synthetic asphalts as in the '896 patent, are mixtures of gilsonite, or man-made asphaltene residiums in a tall oil product. Gilsonite is a naturally occurring bituminous hydrocarbon mineral found and mined in Northeastern Utah. Gilsonite is typically comprised of 70 to 90 percent by weight asphaltenes, 5 to 20 percent by weight polar resins, and 5 to 10 percent by weight aromatic and saturated oils. Gilsonite has a melting, or softening point of 140.6° C. (285° F.) to 162.8° C. (325° F.). Man-made asphaltene residiums are very similar in chemical composition and melting, or softening point to gilsonite. Man-made asphaltene residiums are derived from solvent extraction processes for refining crude petroleum oil. In these processes, liquid propane, butane, and/or isobutane under heat and pressure are utilized to precipitate the asphaltenes and polar resins out of the crude petroleum oil. The aromatic and saturated oils may then be easily refined into gasoline, jet fuel, diesel fuel, and lube oils. The asphaltenes and polar resins precipitated out of the crude petroleum oil by these solvent extract refining processes are commonly known as asphaltene residiums.

Tall oil products, which include crude tall oil, tall oil, and tall oil pitch, are derived from the acid digestion of wood chips and saw dust to extract cellulose from which paper is made. During the acid digestion of wood particles and saw dust, the glue that holds the cellulose together is separated from the cellulose. The cellulose is collected, and the mixture of water, acid and glue from the wood particles and saw dust is further separated. One of these separated fractions, known as fatty acid heads, is dewatered, and then is known as crude tall oil. The crude tall oil is then refined in a similar manner as crude petroleum oil, and from this refining processes obtained turpentine, tall oil, rosin, and tall oil pitch. Tall oils are mixtures of oleic and linoleic acids, and are unsaturated oils. Tall oil pitch is a complex mixture of high molecular weight oily and resinous hydrocarbons that are polar. Crude tall oil, tall oil, and tall oil pitch may be used to make synthetic asphalt mixtures by combining them with gilsonite or man-made asphaltene residiums in various proportins at temperatures of 140.6° C. (285° F.) to 260° C. (500° F.). These synthetic asphalts may be made to conform to many of the physical properties and specifications of petroleum asphalts through careful selection of the tall oil product, or blends of tall oil products, with the gilsonite or man-made asphaltene residium as taught in the '896 patent.

Synthetic asphalt may be further modified by the addition of petroleum asphalt, petroleum base oils, petroleum base lube oil extracts, reclaimed and recycled motor oils, reclaimed and recycled motor oil fluxes, polymers, and recycled and granulated minus 10 mesh to minus 80 mesh tire rubber. Polymers that may be used to modify the synthetic asphalt are any polymer compatible with petroleum asphalt such as styrene butadiene styrene coblock polymers, styrene isoprene styrene coblock polymers, styrene butadiene polymers, styrene ethylene styrene butadiene polymers, ethylene vinyl acetate polymers added as a dry powder or in latex form, neoprene latex polymer, acrylic and vinyl acrylic latex polymers, styrene butadiene latex polymer, and other polymer latexes. Synthetic asphalt may also be further modified by the addition of recycled and granulated minus 10 mesh to minus 80 mesh tire rubber. Other modifiers for synthetic asphalt include mineral fillers, crushed and sieve sized mineral aggregates, clays and clay-like materials, and natural or man-made fibers, which when added form mastic synthetic asphalt mixtures.

The cost of petroleum asphalt emulsions, and petroleum base asphalt recycling and maintenance emulsion products has risen sharply in recent years. The availability of emulsions made from synthetic asphalt mixtures may help keep down the costs of road repair, maintenance, and reconstruction in the future. Emulsions of synthetic asphalt mixtures that include minus 10 mesh to minus 80 mesh granulated recycled tire rubber are particularly useful for the construction, repair, and maintenance of city streets, county roads, and state highways. There are incentives in many states to encourage the use of emulsions containing recycled tire rubber for road repair and reconstruction. Preparing such emulsions though is very difficult. This invention sets forth new and unique successful formulations and processing techniques to prepare recycled tire rubber emulsions.

All of the product and material names in the above descriptions, as well as the processes from which they are derived are well known to chemists and technicians within the petroleum refining industry, asphalt products industry, and paper making industry. These chemists and technicians will be able to clearly understand and make the improved synthetic, and improved modified synthetic asphalt tire rubber emulsions from the formulations and processes disclosed herein.

SUMMARY OF THE INVENTION

Synthetic asphalt recycled tire rubber mixtures comprising gilsonite or man-made asphaltene residiums in tall oil products to which are added granulated recycled tire rubber are directly emulsified with chemical and clay in water mixtures at elevated temperatures. The resulting synthetic asphalt recycled tire rubber emulsions are very stable and useful as slurry seal asphalt pavement coatings, asphalt sealcoats for parking lots, roof coatings, and as crackfillers and joint fillers for asphalt and portland cement pavements. Modifiers for these emulsions include petroleum asphalts and oils, lube oil extracts, reclaimed and recycled motor oils and motor oil fluxes, polymers, latex polymers, mineral fillers, crushed and sieve sized mineral aggregates, and natural and man-made fibers.

DETAILED DESCRIPTION OF THE INVENTION AND PROCESSES

The following formulas disclose synthetic asphalt and petroleum product modified synthetic asphalt modified emulsions that contain granulated minus 10 mesh to minus 80 mesh recycled tire rubber. Also disclosed are methods for making these emulsions at temperatures above ambient, or room temperatures. There have been issued patents to Michael V. Burris in 1996 and 1998 for tire rubber modified asphalt emulsions. These patents involve the addition of granulated recycled tire rubber at ambient, or room temperatures to an asphalt emulsion that has been modified with mineral fillers, clay, and clay-like materials. None of the disclosures or claims of the Burris patents teach how to make emulsions by directly emulsifying the mixtures of asphalt and granulated recycled tire rubber at elevated temperatures. None of the disclosures or claims of the Burris patents teach how to make granulated recycled tire rubber emulsions directly from synthetic, or modified synthetic asphalt mixtures.

Depending upon the end use, some of these formulations may provide superior results to other formulations, all meet current specifications for products used in a variety of asphalt products including slurry seal asphalt pavement coatings, asphalt sealcoatings for asphalt parking areas, emulsified asphalt roof coatings, and as crackfillers and joint sealants for asphalt and portland cement pavements. Of particular interest is the use of significant quantities of recycled materials including granulated recycled tire rubber, and reclaimed and recycled motor oils and motor oil fluxes. Of additional particular interest is the use of aluminum chloride and ferric chloride in the clay and water mixtures to form emulsifying agents for the synthetic and modified synthetic asphalt mixtures.

A. Emulsified Synthetic Asphalt and Modified Synthetic Asphalt Recycled Tire Rubber Emulsions

EXAMPLE 1

A synthetic asphalt comprised of gilsonite and tall oil pitch, modified with granulated minus 20 mesh recycled tire rubber and petroleum base lube oil extract was prepared at 260° C. (500° F.) and allowed to cool to 204° C. (400° F.). The actual composition of the modified synthetic asphalt was 62% by weight tall oil pitch, 15% by weight gilsonite, 20% by weight granulated minus 20 mesh recycled tire rubber, and 3% by weight petroleum base lube oil extract. While the modified synthetic asphalt recycled tire rubber mixture was cooling, a mixture comprising 53.62% by weight kaolinite clay in 46.33% by weight water at room temperature was prepared using moderate to light agitation in cylindrical mixing vessel. The pH of the clay in water mixture was adjusted to about 10.5 using 0.05% by weight sodium hydroxide.

The 204° C. (400° F.) modified synthetic asphalt tire rubber mixture was slowly added to the room temperature clay in water mixture while moderate to light low shear agitation was continued. The modified synthetic asphalt tire rubber mixture was emulsified by the clay in water mixture until the temperature of the emulsion being made began to get near to 93.3° C. (200° F.), very near the boiling point of water. Additional water was added to lower the temperature and to keep the emulsion from boiling and being ruined, until the desired amount of modified synthetic asphalt tire rubber mixture had been added and emulsified. The temperatures at which the emulsion was formed and completed varied between 54.4° C. (130° F.) and 93.3° C. (200° F.). Additional water was then added to adjust the solids content of the emulsion to about 52% by weight. The additional water also adjusted the final viscosity of the emulsion as determined by a Brookfield rotational viscometer turning at 10 rpm with a number 6 spindle to about 10,000 centipoise at 25° C. (77° F.).

The resulting emulsion was comprised of 47.9% by weight water, a trace amount of sodium hydroxide, 33.6% by weight modified synthetic asphalt tire rubber mixture, and 18.5% by weight kaolinite clay. The residue by evaporation of this emulsion was 52.7% by weight, and the actual viscosity of the emulsion after it had cooled to room temperature was 9800 centipoise. This improved modified synthetic asphalt tire rubber emulsion was tested as a cold applied asphalt-rubber crackfiller for asphalt pavement and found to be highly satisfactory. This improved modified synthetic asphalt tire rubber emulsion could also be used as an ASTM D 1227 Type II roof coating.

EXAMPLE 2

A synthetic asphalt modified with petroleum asphalt, recycled motor oil flux, and granulated minus 10 mesh to minus 80 mesh recycled tire rubber was prepared at a temperature of 260° C. (500° F.) and allowed to cool to 162.8° C. (325° F.). The actual composition of this mixture was 65.0% by weight PG (Performance Grade) 64-22 petroleum asphalt, 7.5% by weight tall oil pitch, 8.0% by weight gilsonite, 9.5% by weight recycled motor oil flux, and 10.0% by weight granulated minus 30 mesh recycled tire rubber. While the modified synthetic asphalt tire rubber mixture was cooling, a mixture comprising 92.10% by weight cold water, 0.47% by weight sodium chromate, 3.48% by weight nonylphenol surfactant, and 3.95% by weight bentonite clay was prepared at room temperature. This chemical and clay in water mixture was prepared with moderate to high shear agitation in a cylindrical vessel and mixed until uniform. Sodium chromate was the pH adjusting substance used, and the pH when checked was found to be 6.5.

The chemical and clay in water mixture was prepared using a Silverson duplex ultra high shear mixer at 3000 rpm. This mixer speed was then increase to 6500 rpm and the modified synthetic asphalt tire rubber mixture, at temperatures of 162.8° C. (325° F.) to 135° C. (275° F.), was slowly introduced until the desired amount had been added. The modified synthetic asphalt tire rubber was readily emulsified into the chemical clay in water mixture by the ultra high speed Silverson duplex mixer. The modified synthetic asphalt tire rubber emulsion was subjected to additional high shear mixing at 6500 rpm to 9000 rpm until a stable emulsion at 71.1° C. (160° F.) to 87.8° C. (190° F.) was formed. To this emulsion was then added an additional 2.25% by weight minus 30 mesh granulated recycled tire rubber, and 2.05% by weight cationic styrene butadiene latex polymer and mixing continued until a uniform emulsion was attained.

This emulsion was then allowed to cool to room temperature and then tested. The residue by evaporation of the emulsion was found to be 50.25% by weight. The viscosity of the emulsion using a Brookfield rotational viscometer at 10 rpm with the number 6 spindle was 3800 centipoise. The actual composition of this emulsion was 49.00% by weight water, 0.25% by weight sodium chromate, 1.85% by weight nonylphenol surfactant, 2.10% by weight bentonite clay, 2.05% by weight cationic styrene butadiene latex polymer, 27.63% by weight PG 64-22 petroleum asphalt, 3.19% by weight tall oil pitch, 3.40% gilsointe, 4.03% by weight recycled motor oil flux, and 6.50% by weight granulated minus 30 mesh recycled tire rubber. In this emulsion, sodium chromate was used as the pH adjusting substance. Other similar chemicals that could be used to adjust the pH include chromic acid, sodium dichromate, and potassium dichromate.

This improved modified synthetic asphalt tire rubber emulsion meets or exceeds the specifications for ASTM D 1227 Type III roof coating. This improved modified synthetic asphalt tire rubber emulsion also performs well as cold applied crackfiller for asphalt and portland cement pavements. An additional unique feature of this emulsion in the incorporation of used, reclaimed, and recycled motor oil flux. Reclaimed and recycled motor oils may also be used in a similar manner as the reclaimed and recycled motor oil flux as performance enhancing additives.

EXAMPLE 3

A synthetic asphalt modified with petroleum asphalt was prepared at temperatures of 162.8° C. (325° F.) to 176.7° C. (350° F.) with moderate to high shear mixing. However, this modified synthetic asphalt mixture may be prepared at temperatures as low as 135° C. (275° F.). This modified synthetic asphalt mixture was comprised of 86.9% by weight PG 64-22 petroleum asphalt, but may comprise a range of 84% to 90% by weight petroleum asphalt. 6.67% by weight gilsonite, but may comprise a range of 1% to 12% by weight gilsonite or man-made asphaltene residium, and 6.43% by weight tall oil pitch, but may comprise 1% to 12% by weight tall oil product. A chemical clay in water mixture was prepared comprised of 90.05% by weight water, 0.38% by weight aluminum chloride, 4.48% by weight bentonite clay, and 4.73% by weight nonylphenol surfactant, using a Silverson duplex ultra high shear mixer at a temperature of 23.3° C. (74° F.), with a pH of 6.2. However, allowable ranges for by weight percent of water, aluminum chloride, bentonite clay and nonylphenol surfactant comprise, respectively, 87% to 93%, 0.1% to 0.5%, 3% to 6% and 1% to 6%. The temperature at which this mixture is prepared may range from 4.4° C. (40° F.) to 37.8° C. (100° F.) and the pH may range from 4 to 6.5. In the chemical clay in water mixture, aluminum chloride was the pH adjusting substance.

The modified synthetic asphalt mixture at temperatures of 135° C. (275° F.) to 162.8° C. (325° F.) was slowly added to the chemical clay in water mixture with the Silverson duplex ultra high shear mixer turning at 6500 rpm, and mixing was continued until a stable emulsion was formed. With the mixer still turning at 6500 rpm, granulated minus 30 mesh recycled tire rubber was added, in a range of 4% to 7% by weight, followed by the addition of 1% to 5% by weight cationic acrylic polymer latex, and the resulting emulsion mixed at 6500 rpm until uniform. While the sample was made with granulated minus 30 mesh recycled tire rubber, the recycled tire rubber may comprise 4% to 7% by weight granulated minus 10 mesh to minus 80 mesh. The temperature at which the final emulsion was formed was between 71.1° C. (160° F.) to 87.8° C. (190° F.). The final emulsion was comprised of 47.60% by weight water, 0.02% by weight aluminum chloride, 2.56% by weight bentonite clay, 2.50% by weight nonylphenol surfactant, 39.47% by weight synthetic asphalt modified with petroleum asphalt, 6.67% by weight granulated minus 30 mesh recycled tire rubber, and 1.0% by weight cationic acrylic polymer latex. The residue by evaporation of this new improved and unique emulsion was 48.1% by weight. The viscosity was found to be 15,300 centipoise after the emulsion had been made, and 825 centipoise after it had sat undisturbed at room temperature for 18 hours. Depending upon the relative percentages of the components in the mixtures, the final emulsion may comprise 45% to 50% by weight water, 0.1% to 0.3% by weight aluminum chloride, 1% to 4% by weight nonylphenol surfactant, 1% to 3% by weight bentonite clay, 1% to 5% by weight cationic polymer latex, 32% to 40% by weight petroleum asphalt, 0.4% to 5% by weight gilsonite or man-made asphaltene residium, 0.4% to 5% by weight tall oil product, and 3% to 10% by weight granulated minus 10 mesh to minus 80 mesh recycled tire rubber, where the final emulsion is formed at temperatures between 60° C. (140° F.) to 98.9° C. (210° F.).

A unique feature of this emulsion is the use of aluminum chloride as the pH adjusting substance. In water, aluminum chloride yields positive aluminum ions, and negative chloride ions. The aluminum ions attach themselves to the clay particles and helps render them capable of emulsifying the modified synthetic asphalt mixture. The chloride ions lower the pH of the chemical clay in water mixture to 6.5 or below, which is required to make a stable cationic mineral colloidal, or clay emulsion. Chemists skilled in the art of making clay emulsions usually add chemicals that add chromium ions to adjust the pH of the clay in water mixtures. These chemical include chromic acid, sodium chromate, sodium dichromate, and potassium dichromate. In recent years though, it has been found that chromium ions can be harmful, toxic, and hazardous. Aluminum reacts in many similar ways to chromium, but does not share the unhealthy and harmful effects of chromium. Chemists making clay emulsions have not caught on to using aluminum chloride in place of chromium chemicals.

This improved, new, and unique modified synthetic asphalt recycled tire rubber emulsion may be used as a crackfiller for asphalt and portland cement pavements, as an ASTM D 1227 Type III roof coating, as an asphalt pavement sealcoat, and as a slurry seal asphalt pavement coating when mixed with crushed and sieve sized mineral aggregates.

EXAMPLE 4

A petroleum asphalt modified synthetic asphalt mixture was prepared as in example 3 above. A chemical clay in water mixture comprised of 91.63% by weight water, 0.39% by weight ferric chloride, 5.84% bentonite clay, 1.95% by weight nonylphenol surfactant, and 0.19% by weight citric acid was prepared using a Silverson duples ultra high shear mixer at 23.3° C. (74° F.), with a pH of 4.5. However, the second mixture may be prepared at a temperature of 4.4° C. (40° F.) to 60° C. (140° F.) with a pH ranging from 4 to 6.5.

The concentrations of the components of the chemical clay in water mixture may vary. The water may range from 87% to 90% by weight. The bentonite clay may range from 3% to 6% by weight and the nonylphenol surfactant may range from 1% to 6% by weight. The pH adjusting substances in this chemical clay in water mixture were the ferric chloride and the citric acid. The by weight composition of ferric chloride and citric acid may, respectively, range from 0.1% to 0.5% and 0.1% to 0.5%.

The modified synthetic asphalt mixture at 135° C. (275° F.) to 162.8° C. (325° F.) was added to the chemical clay in water mixture with the Silverson ultra high shear mixer turning at 6500 rpm until the desired quantity had been added and emulsified. With the mixer still turning at 6500 rpm, granulated minus 30 mesh recycled tire rubber and cationic styrene butadiene latex polymer was added and mixed until uniform. The temperature at which the final emulsion was made was between 71.1° C. (160° F.) to 87.8° C. (190° F.). The final emulsion was comprised of 47.1% by weight water, 0.2% by weight ferric chloride, 3.0% by weight bentonite clay, 1.0% by weight nonylphenol surfactant, 0.1% by weight citric acid, 40.0% by weight modified synthetic asphalt, 6.6% by weight granulated minus 30 mesh recycled tire rubber, and 2.0% by weight cationic styrene butadiene latex polymer. While the sample was made with 6.6% by weight granulated minus 30 mesh recycled tire rubber, the recycled tire rubber may comprise 4% to 7% by weight granulated minus 10 mesh to minus 80 mesh. The residue by evaporation of this new, improved, and unique emulsion was 51.0% by weight. The viscosity of the emulsion after it had sat undisturbed 18 hours at 23.3° C. (74° F.), as determined by a Brookfield rotational viscometer turning at 10 rpm with a number 6 spindle was 800 centipoise. Depending upon the relative percentages of the components in the mixtures, the final emulsion may comprise 45% to 50% by weight water, 0.1% to 0.3% by weight ferric chloride, 0.1% to 0.3% by weight citric acid, 1% to 4% by weight nonylphenol surfactant, 1% to 3% by weight bentonite clay, 1% to 5% by weight cationic polymer latex, 32% to 40% by weight petroleum asphalt, 0.4% to 5% by weight gilsonite or man-made asphaltene residium, 0.4% to 5% by weight tall oil product, and 3% to 10% by weight granulated minus 10 mesh to minus 80 mesh recycled tire rubber, where the final emulsion is formed at temperatures between 60° C. (140° F.) to 98.9° C. (210° F.). This improved modified synthetic asphalt recycled tire rubber emulsion could be used as an ASTM 1227 Type III roof coating, as a crackfiller for asphalt and portland cement pavements, as an asphalt pavement parking lot sealcoat, and for the preparation of slurry seal asphalt pavement coatings.

A unique feature of this emulsion is the replacement of chromium containing substances with ferric chloride. The chloride ions from the ferric chloride, along with ions from the citric acid adjust the pH of the chemical clay in water mixture. Chemists skilled in the art of making mineral colloidal clay emulsions normally use chemical such as chromic acid, sodium chromate, sodium dichromate, and potassium dichromate to adjust the pH and prepare emulsions. The use of ferric chloride along with citric acid is unknown to these chemists. The ferric ions react in similar ways as the chromium ions, but the ferric ions do no share the harmful and unhealthy effects of exposure to chromium ions.

This improved modified synthetic asphalt tire rubber emulsion may be used as a crackfiller for asphalt and portland cement pavements, as an ASTM D 1227 Type III roof coating, as an asphalt parking lot sealcoat, and in the preparation of slurry seal asphalt pavement coatings.

B. Processes for Making the Improved Emulsified Synthetic and Modified Synthetic Asphalt Tire Rubber Emulsions In the examples, the improved synthetic tire rubber modified emulsion is made with low to moderate shearing and mixing. The preferred equipment for production of the products is a cylindrical, or semi-cylindrical horizontal tank equipped with a central shaft and paddles, and/or helical ribbons. These tanks are commonly known as paddle or ribbon blenders. There are vertical cylindrical tanks that may be equipped with paddles and/or helical ribbons that may also be used.

The first step in making the example 1 product is to prepare a clay in water mixture comprised of 50% to 55% by weight kaolinite clay in 50% to 45% by weight water. This mixture may be made at temperatures between 4.4° C. (40° F.) and 37.8° C. (100° F.). Mixing should continue until there are no lumps of undispersed clay. The pH of this mixture should be adjusted to about 10.5 using small amounts of sodium hydroxide, sodium metasilicate pentahydrate, sodium metasilicate nanohydrate, or potassium hydroxide.

The second step in making the example 1 product is to prepare a synthetic asphalt mixture modified with minus 10 mesh to minus 80 mesh granulated recycled tire rubber at temperatures of 162.8° C. (325° F.) to 260° C. (500° F.). Tall oil pitch and gilsonite are combined first, followed by the granulated recycled tire rubber, with light to moderate mixing.

The third step in making the example 1 product is to slowly add the synthetic asphalt recycled tire rubber modified mixture to the clay in water mixture with light to moderate mixing, until the desired amount has been added and emulsified. During the addition of the synthetic asphalt recycled tire rubber mixture, additional water must be added to keep the emulsion that is being made from boiling and to adjust the viscosity low enough for the mixers to be effective. After the required synthetic asphalt recycled tire rubber mixture has been added, mixing continues for 15 to 60 minutes. Additional water may then be added to adjust the residue content to 48% to 55% by weight, and to adjust the viscosity to between 500 to 20,000 centipoise. The final emulsion typically has a temperature of between 54.4° C. (130° F.) to 60° C. (160° F.).

Moderate to high shear mixers such as batch type vertical, bottom, or side entry high shear mixers may also be used to produce an example 1 product. With these types of mixers the initial kaolinite clay in water mixture should be 15% to 29% kaolinite clay. Chemicals such as sodium hydroxide, sodium, metasilicate pentahydrate, sodium metasilicate nanohydrate, or potassium hydroxide are then added to adjust the pH. The pH adjusted clay in water mixture should be between 4.4° C. (40° F.) and 37.8° C. (100° F.) The desired quantity of synthetic asphalt recycled tire rubber mixture at between 162.8° C. (325° F.) to 204° C. (400° F.) is then slowly added while the high shear mixers are turning at 3500 to 9000 rpm. Mixing and shearing is continued until a stable emulsion has been formed. Near the end of the mixing process, additional water may be added to adjust the residue by evaporation and viscosity. Temperature of the final emulsion using these types of mixers are between 54.4° C. (130° F.) and 71.1° C. (160° F.).

Continuous high shear mixers commonly known as colloid mills may also be used to Make the example 1 product but only if there is capability to recirculate the entire batch of product back through the mill until a stable emulsion has been made. With this process, the clay in water mixture is prepared, adjusted to the desired pH, and brought to temperature of between 25° C. (77° F.) and 37.8° C. (100° F.). The clay in water mixture along with the synthetic asphalt tire rubber modified mixture at between 162.8° C. (325° F.) to 204° C.

(400° F.) are then pumped through the mill with the mill turning at 1750 to 6000 rpm, and recirculated through the mill until the stable final emulsion is made at between 60° C. (140° F.) to 87.8° C. (190° F.).

In examples 2, 3, and 4, the synthetic asphalt tire rubber emulsions are made with a vertically suspended ultra high shear mixer in a vertical cylindrical tank. The ultra high shear mixer is equipped with a high speed chopper within a shrouded zone above the rotor-stator emulsifying workhead. As the ultra high shear mixer turns at 3500 to 9000 rpm, a strong vortex is generated which draws the synthetic asphalt tire rubber mixture into the shrouded zone where it is chopped into small enough pieces to be emulsified by the rotor-stator workhead. Two manufacturers of these types of ultra high shear mixers are the Charles Ross and Son Ross Mixer Disolver, and the Silverson Machines, Inc, Duplex Disintegrator/Disslover.

In the example 2, 3, and 4 products, the first step is to prepare the chemical clay in water mixtures. The second step is to prepare the synthetic asphalt recycled tire rubber modified mixtures. The third step is to slowly add the synthetic asphalt recycled tire rubber modified mixtures to the chemical clay in water mixtures with the ultra high shear mixer turning at 3500 to 9000 rpm, and to continue mixing until a stable and uniform emulsion has been made. The final emulsion may then be further modified by adding more granulated recycled tire rubber and latex polymer, with mixing continuing with the ultra high shear mixer until uniform. The temperatures at which the example 2, 3, and 4 products are made are between 60° C. (140° F.) to 87.8° C. (190° F.).

Continuous high shear colloid mills equipped with multiple inline rotor-stators such as the Greerco Corporation Tandem Shear Pipeline Mixer, the Greerco Corporation Tandem Refiner, and the IKA Works USA Dispax-Reactor may be used to produce the new improved and unique synthetic asphalt recycled tire rubber and modified synthetic asphalt recycled tire rubber emulsions. Single stage colloid mills equipped with a single rotor-stators may be used with recirculation, or two or more single stage colloid mills with recirculation may be used to produce these emulsions. The temperatures of the final emulsions are 60° C. (140° F.) to 87.8° C. (190° F.).

All of the emulsions described above may include other additives. For example, co-emulsifiers may be added, including nonylphenol surfactants, to assist with emulsification. Other co-emulsifiers such as quaternary ammonium chlorides may shorten cure times and improve final performance of the emulsions. Various other performance enhancing additives include, petroleum asphalt, petroleum base oils, petroleum base lube oil extracts, reclaimed and recycled motor oils and motor oil fluxes, polymers added as dry polymer or in latex form, and granulated minus 10 mesh to minus 80 mesh recycled tire rubber which may be or may not be prereacted, all of which are usually added to the synthetic asphalt base, or modified synthetic asphalt base prior to emulsification. Performance enhancing additives added after the emulsification process include anionic or cationic polymer latex including styrene butadiene latex, acrylic polymer latex, vinyl-acrylic polymer latex, and neoprene polymer latex. Natural and man-made fibers may be added as performance enhancing additives. End use performance enhancing additives include sand, crushed and sieve sized mineral aggregates, mineral fillers, crushed and sieve sized recycled asphalt pavement, crushed and sieve sized portland cement pavement, or any combinations thereof.

What is claimed is:

1. A composition of petroleum asphalt modified synthetic asphalt recycled tire rubber emulsion which may be used as a crackfiller for asphalt and portland cement pavements, as a roof coating, as a sealcoat for asphalt pavement parking lots, and to prepare slurry seal coatings for asphalt pavements, the composition comprising:

a first mixture of petroleum asphalt modified synthetic asphalt comprising 84% to 90% by weight petroleum asphalt, 1% to 12% by weight gilsonite or man-made asphaltene residium, and 1% to 12% by weight tall oil product, the first mixture at between 135° C. (275° F.) to 176.7° C. (325° F.) combined with high shear into a second mixture;

the second mixture comprising 87% to 93% by weight water, 0.1% to 0.5% by weight aluminum chloride, 1% to 6% by weight nonylphenol surfactant, and 3% to 6% by weight bentonite clay, at 4.4° C. (40° F.) to 37.8° C. (100° F.) with a pH of 4 to 6.5;

wherein the first mixture when added and mixed with high shear into the second mixture results in an emulsion, wherein 4% to 7% by weight granulated minus 10 mesh to minus 80 mesh recycled tire rubber, and 1% to 5% by weight cationic polymer latex are added results in a final emulsion comprising 45% to 50% by weight water, 0.1% to 0.3% by weight aluminum chloride, 1% to 4% by weight nonylphenol surfactant, 1% to 3% by weight bentonite clay, 1% to 5% by weight cationic polymer latex, 32% to 40% by weight petroleum asphalt, 0.4% to 5% by weight gilsonite or man-made asphaltene residium, 0.4% to 5% by weight tall oil product, and 3% to 10% by weight granulated minus 10 mesh to minus 80 mesh recycled tire rubber, at temperatures between 60° C. (140° F.) to 98.9° C. (210° F.).

2. A composition of a petroleum asphalt modified synthetic asphalt tire rubber emulsion which may be used as a crackfiller for asphalt and portland cement pavements, as a roof coating, as a sealcoat for asphalt pavement parking lots, and to prepare slurry seal coatings for asphalt pavements, the composition comprising:

a first mixture of a petroleum asphalt modified synthetic asphalt comprising 84% to 90% by weight petroleum asphalt, 1% to 12% by weight gilsonite or man-made asphaltene residium, 1% to 12% by weight tall oil product, the first mixture prepared at 135° C. (275° F.) to 176.7/C (350° F.), and added with high shear into a second mixture;

the second mixture comprising 87% to 90% by weight water, 0.1% to 0.5% by weight ferric chloride, 0.1% to 0.5% citric acid, 1% to 6% by weight nonylphenol surfactant, and 3% to 6% by weight bentonite clay, at 4.4° C. (40° F.) to 60.0° C. (140° F.), with a pH of 4 to 6.5;

wherein the first mixture when added and mixed with high shear into the second mixture results in an emulsion, wherein 4% to 7% by weight granulated minus 10 mesh to minus 80 mesh recycled tire rubber, and 1% to 5% by weight cationic polymer latex are added results in an emulsion comprising 45% to 50% by weight water, 0.1% to 0.3% by weight ferric chloride, 0.1% to 0.3% by weight citric acid, 1% to 4% by weight nonylphenol surfactant, 1% to 3% by weight bentonite clay, 1% to 5% by weight cationic polymer latex, 32% to 40% by weight petroleum asphalt, 0.4% to 5.0% by weight gilsonite or man-made asphaltene residium, 0.4% to 5% by weight tall oil product, and 3% to 10% by weight granulated minus 10 mesh to minus 80 mesh recycled tire rubber, at between 60° C. (140° F.) to 98.9° C. (210° F.).

* * * * *